(12) United States Patent
Herzog

(10) Patent No.: US 7,322,160 B2
(45) Date of Patent: Jan. 29, 2008

(54) MONITORING SYSTEM FOR INDUCTION SEALER

(76) Inventor: Kenneth J. Herzog, 200 Mill Rd., Riverhead, NY (US) 11901-3125

( * ) Notice: Subject to any disclaimer, the term of this patent is extended or adjusted under 35 U.S.C. 154(b) by 92 days.

(21) Appl. No.: 11/131,124

(22) Filed: May 17, 2005

(65) Prior Publication Data
US 2005/0284102 A1 Dec. 29, 2005

Related U.S. Application Data

(60) Provisional application No. 60/572,027, filed on May 17, 2004.

(51) Int. Cl.
*B65B 57/00* (2006.01)
*B65B 3/26* (2006.01)
(52) U.S. Cl. .................................. 53/75; 53/329.2
(58) Field of Classification Search ............ 53/75, 53/76, 329.2–329.5; 374/120, 121, 4, 45, 374/57, 141
See application file for complete search history.

(56) References Cited

U.S. PATENT DOCUMENTS

| | | | | |
|---|---|---|---|---|
| 4,613,746 A * | 9/1986 | MacLaughlin | ............... | 53/478 |
| 4,722,168 A * | 2/1988 | Heaney | ............... | 53/450 |
| 5,117,613 A * | 6/1992 | Pfaffmann | ............... | 53/478 |
| 5,187,921 A * | 2/1993 | Wilson et al. | ............... | 53/453 |
| 5,269,123 A * | 12/1993 | Marchesini | ............... | 53/559 |
| 5,297,597 A * | 3/1994 | Herzog | ............... | 141/157 |
| 5,644,895 A * | 7/1997 | Edwards et al. | ............... | 53/55 |
| 6,050,055 A * | 4/2000 | Calvert et al. | ............... | 53/300 |
| 6,092,643 A * | 7/2000 | Herzog | ............... | 198/444 |
| 6,898,868 B2 * | 5/2005 | Vermeulen | ............... | 34/528 |
| 2005/0252172 A1* | 11/2005 | Herzog | ............... | 53/329.3 |
| 2006/0273080 A9* | 12/2006 | Herzog | ............... | 219/604 |
| 2006/0288663 A1* | 12/2006 | Herzog | ............... | 53/478 |

FOREIGN PATENT DOCUMENTS

WO    WO 03/024694 A1 *    3/2003

* cited by examiner

*Primary Examiner*—Stephen F Gerrity
(74) *Attorney, Agent, or Firm*—Ostrolenk, Faber, Gerb & Soffen, LLP

(57) ABSTRACT

An induction foil cap sealer system includes a monitoring system that comprises a plurality of sensors disposed throughout the sealer system, each sensor monitoring a respective condition related to the sealing operation. A controller is configured to receive from the sensors data representing the monitored conditions and to process this data, determining operating information related to the sealing operation and possibly fault conditions with the sealing operation. The controller is also configured to communicate with a display system and to cause this display system to activate one or more peripheral devices in order to report to a system operator, for example, the determined operating information and/or fault conditions related to the monitored conditions. In reaction to a detected fault condition, the controller may also be configured to shutdown the cap sealer system and/or to remove work pieces that the controller has determined contain a faulty condition.

18 Claims, 11 Drawing Sheets

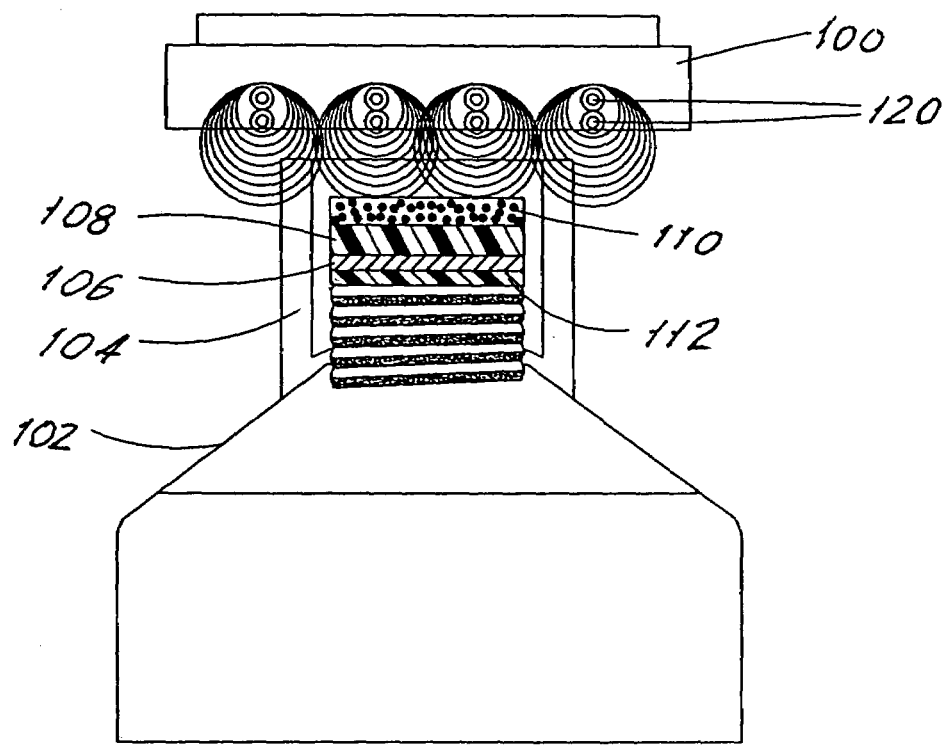
FIG. 1
(prior art)
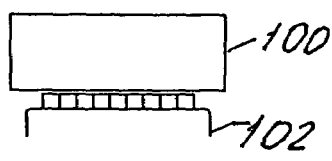 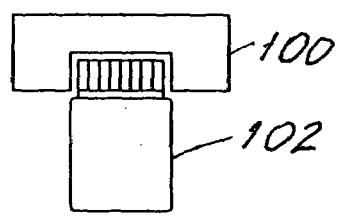 
FIG. 2A        FIG. 2B        FIG. 2C
(prior art)        (prior art)        (prior art)

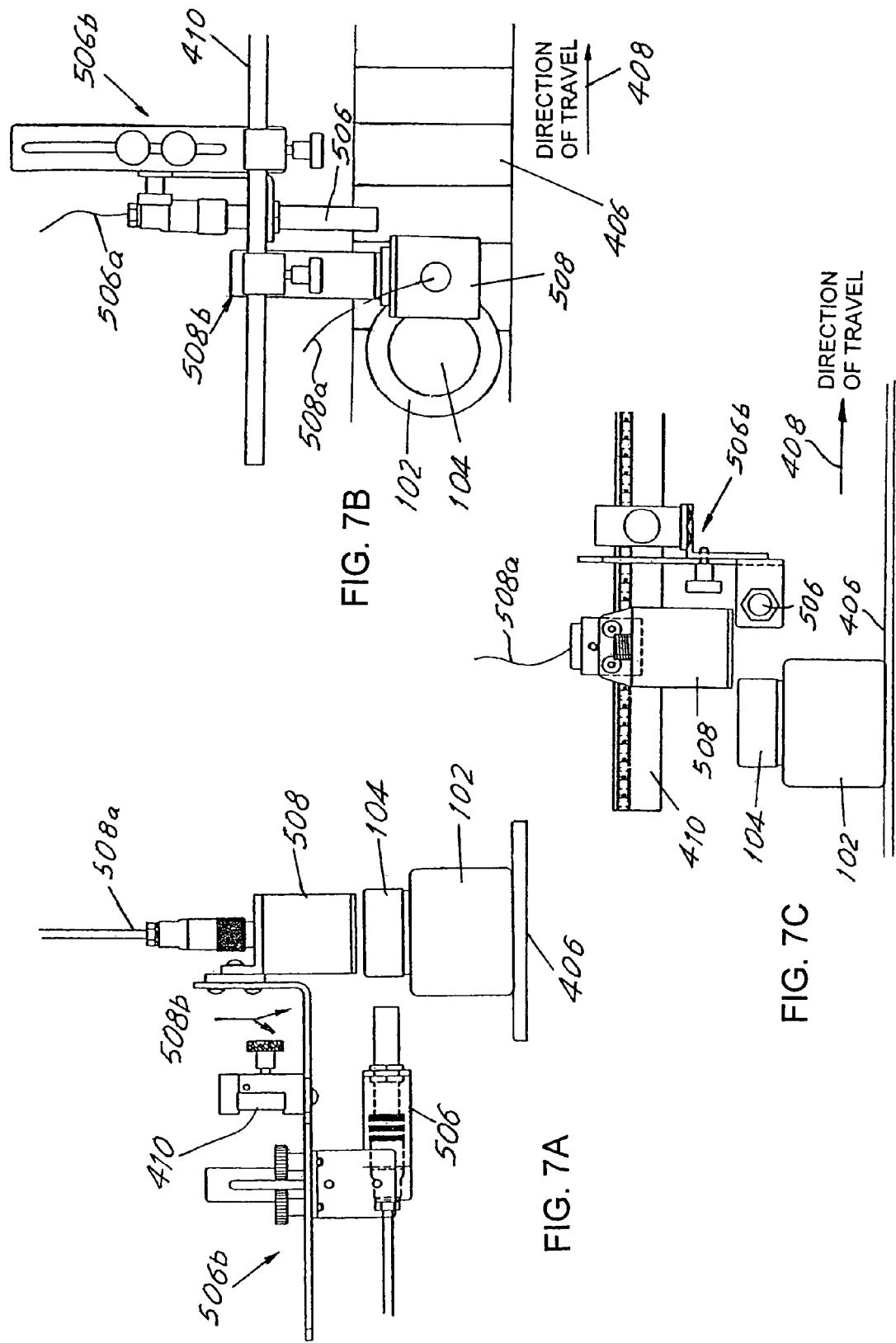

MONITORING SYSTEM FOR INDUCTION SEALER

RELATED APPLICATIONS

This application is based on and claims priority to U.S. Provisional Application No. 60/572,027, filed on May 17, 2004, by Kenneth J. Herzog, entitled, "A BAR GRAPH DISPLAY, AN IR THERMOMETER, AND A SPEED SENSOR WHICH CAN BE USED INDIVIDUALLY OR IN COMBINATION WITH AN INDUCTION SEALER," the contents of which are herein incorporated by reference.

BACKGROUND OF THE INVENTION

1. Field of the Invention

The present invention relates to induction foil cap sealers and more particularly, to an induction foil cap sealer with a monitoring system for monitoring the sealing operation.

2. Description of the Prior Art

Induction foil cap sealers are well known. Referring to FIG. 1, a prior art induction foil cap sealer includes induction head 100 that includes a plurality of field coils 120. In operation, field coils 120 receive an electrical current that causes the development of magnetic fields that project away from field coils 120. The projected magnetic fields are schematically shown as circular lines surrounding field coils 120 for illustration purposes only. The magnetic fields projecting from field coils 120 are used for sealing a cap onto an opening of a bottle in the following manner.

Cap 104 is mechanically coupled to the opening of bottle 102 and placed under induction head 100. Due to the mechanical coupling between cap 104 and bottle 102, metallic foil 106, which is received in cap 104, is pressed between the end of cap 104 and the sealing edge of the opening of bottle 102. Included inside cap 104 is polymer sealing film 112, which is interposed between metallic foil 106 and the opening of bottle 102. Optionally, wax layer 108 and pulp board liner 110 are also included in cap 102 and sandwiched between metallic foil 106 and the closed end of cap 104.

To effect the seal, magnetic fields that project from field coils 120 permeate cap 104 and cause foil 106 to heat up. The heat so generated causes polymer sealing film 112 to melt and thus seal metallic foil 106 to the opening of bottle 102. As a result, a hermetic seal between metallic foil 106 and bottle 102 is obtained which can survive the removal of cap 104. If optional wax layer 108 is used, the generated heat melts wax layer 108 further enhancing the hermetic effect.

Induction head 100 may assume any number of shapes depending on the type of cap used. FIGS. 2A-2C illustrate three examples of induction heads.

Referring to FIG. 3, which illustrates a top down view of an example induction foil cap sealer system 130, in a typical induction sealing operation, a cap 104 and metallic foil 106 are mechanically coupled to each of a series of bottles 102 (this operation is not shown in the Figure) and the bottles are transported on a conveyor belt 134 under an induction head 100. Induction head 100 is included as part of induction sealer 132 and is positioned over conveyor belt 134. As the bottles are transported on the conveyor belt under the induction head, the bottles are subjected to induction heating as described above, thereby forming a hermetic seal.

In general, before sealed bottles leave a manufacturer's plant, it is commercially important that a hermetic seal of good quality be formed on each bottle. For example, when the content of a container is medicine, a misapplied foil 106 may cause a consumer to suspect product tampering, thereby returning the product to the manufacturer and affecting manufacturer costs. Numerous factors can affect the quality of a hermetic seal. For example, a bottle may be missing foil 106, thereby never forming a hermetic seal or a cap may be misapplied when mechanically coupled to a bottle (e.g., skewed or not tightened), thereby causing the metallic foil to not completely contact and seal to the bottle opening. Similarly, a hermetic seal may be incorrectly formed as a result of the bottle being under or over heated, for example. Under or over heating may be the result of conveyor belt 134 moving too slow or too fast or insufficient power being supplied to induction head 100. Notably, a system operator can constantly oversee the sealing operation of foil cap sealer system 130 and physically inspect each bottle, all in an attempt to ensure that the system is properly operating and that quality hermetic seals are being formed. However, this is labor intensive and costly and it may be difficult for an operator to even detect a problem when it occurs.

In addition, because the sealing operation is a mechanical and automated process, system failures can occur. For example, bottles can stall under the induction head due to a conveyor belt stopping or bottles jamming and as a result, become overheated. Similarly, the system may overheat. Again, a system operator can constantly oversee the sealing operation, but this is costly.

Accordingly, it is desirable to have an automated monitoring system to monitor conditions related to the sealing and system operation of a foil cap sealer system so as to notify an operator of possible problems and to assist that operator in diagnosing the problems.

SUMMARY OF THE INVENTION

According to the present invention, a monitoring system monitors various conditions related to the sealing operation of an induction foil cap sealer system and conveys data related to these conditions to a system operator. Specifically, a monitoring system of the present invention comprises a plurality of sensors disposed throughout an induction foil cap sealer system, which system includes a cap sealer unit with an induction head and a conveyor belt for moving work pieces under the induction head. Each sensor monitors a respective condition related to the sealing operation of the cap sealer system. A controller of the monitoring system is configured to receive from the sensors data representing the respective monitored conditions and to process this data in order to determine operating information related to the sealing operation and to determine possible fault conditions with the sealing operation. The monitoring system of the present invention also comprises a display system that controls one or more peripheral devices including, for example, a user interface with LEDs and a user display, an audio signal generator, an optical signal generator, or any combination thereof. The controller is configured to communicate with this display system and to cause this display system to report to a system operator through the peripheral devices the determined operating information and/or fault conditions related to the monitored conditions.

According to one aspect of the present invention, the monitoring system may include a work piece counter sensor that detects work pieces. Based on data provided by this sensor, the controller detects/counts the number of work pieces being processed by the cap sealer system and may convey this count and related information to the display system for display. In the preferred embodiment of the present invention, the work piece counter sensor is installed at a position prior to induction heating and is a photo eye that detects a reflection from passing work pieces.

According to another aspect of the present invention, the monitoring system may include a missing foil sensor that detects the presence, or lack thereof, of a metallic foil on passing work pieces. In the preferred embodiment of the present invention, the missing foil sensor is a foil detector positioned prior to induction heating and coincident with the above mentioned photo eye. Through data signals from each of these sensors, the controller determines whether a work piece has a metallic foil and registers a fault condition when the foil is missing. Upon registering a fault, the controller may be configured to cause the display system to activate one or more peripheral devices to indicate the presence of the fault. Preferably, the controller is also configured to cause a rejecter, such as a pneumatic device, to activate in order to remove the work piece from the cap sealer system or alternatively, to cause the induction head and possibly the conveyor belt to shutdown.

According to another aspect of the present invention, the monitoring system may include a stalled bottle sensor that detects whether work pieces have stopped/jammed (i.e., stalled) under the induction head and are being overheated. In the preferred embodiment of the present invention, the stalled bottle sensor is a photo eye directed under the induction head that detects any work pieces under the head. The controller uses data signals from this photo eye in combination with data signals from the work piece counter photo eye to detect a stalled fault condition. In particular, if the controller determines that work pieces are under the induction head (as detected by the photo eye directed under the induction head) but that the number of work pieces is not incrementing (as detected by the work piece counter photo eye), the controller registers a stalled fault condition. Upon registering the fault, the controller may be configured to cause the display system to activate one or more peripheral devices to indicate the presence of the fault and is preferably configured to cause the induction head and possibly the conveyor belt to shutdown.

According to another aspect of the present invention, the monitoring system may include a high/skewed cap sensor that detects whether a work piece has a skewed cap or a cap not completely tightened. In the preferred embodiment of the present invention, the high/skewed cap sensor is positioned prior to induction heating. As such, this sensor detects, for example, a metallic foil that may not be in good contact with the opening of a work piece, thereby affecting the formation of a quality hermetic seal. Preferably, this sensor is either a laser sensor with an emitter and receiver or a photo eye. Assuming the use of a laser sensor, a laser beam between the emitter and receiver is directed across the path of passing work pieces and is positioned above properly applied caps. Whenever a passing work piece breaks the laser beam, the receiver signals the controller, which then registers a high/skewed cap fault condition. Upon registering the fault, the controller may cause the display system to activate one or more peripheral devices. Preferably, the controller also activates a rejecter to remove the work piece from the cap sealer system or alternatively, causes the induction head and possibly the conveyor belt to shutdown.

According to another aspect of the present invention, the monitoring system may include a work piece temperature sensor, preferably an infrared sensor, that senses the temperature of a work piece after the work piece has been heated under the induction head, thereby enabling the monitoring system to determine whether a foil has been properly sealed to a work piece. In the preferred embodiment of the present invention, each time this temperature sensor acquires temperature information from a work piece, the controller compares the acquired temperature to a low threshold temperature value and to a high threshold temperature value. If the acquired temperature is either below the low threshold temperature value or above the high threshold temperature value, the controller determines that a proper seal has not been obtained and a fault condition is registered. Again, the controller may be configured to cause the display system to activate one or more peripheral devices and preferably, is also configured to activate a rejecter to remove the work piece from the cap sealer system or to cause the induction head and possibly the conveyor belt to shutdown.

According to another aspect of the present invention, the monitoring system may include a work piece speed sensor (e.g., an optical encoder) that detects the speed of the conveyor belt, thereby enabling the monitor system to determine whether work pieces on the conveyor belt are receiving optimum exposure to the induction heating in order to obtain a good seal quality. Here, the controller receives information from the speed sensor, determines from the information the speed of the conveyor belt, and compares this speed to a desired speed. If the controller determines that the speed is outside a desired range, it registers a fault condition and possibly notifies an operator through the display system.

According to another aspect of the present invention, the monitoring system may include a power sensor for monitoring the power consumed by the induction head. In the preferred embodiment of the invention, the power sensor is a current sensor that detects the current supplied to the induction head, the detected current being proportional to the power supplied to the induction head. According to one aspect of the invention, the controller uses the detected current from the current detector to visually display through the display system a representation of the power supplied to the induction head. In this way, a system operator can visually monitor the power consumption of the induction head and can take appropriate action when the power drawn gets close to the maximum power allowed under a selected power setting.

According to another aspect of the present invention, the monitoring system may also include sensors directed at the cap sealer system itself. For example, the monitoring system may include one or more temperature sensors that sense the temperature of the induction head and/or the internal temperature of the cap sealer system. Through these sensors, the controller determines when operating temperatures have exceeded normal operating temperatures, registering a fault condition. The monitoring system may also include sensors for detecting when safety guards and covers are removed. Again, whenever the controller detects a fault related to any of these monitored conditions, it may be configured to cause the display system to activate one or more peripheral devices and preferably, is also configured to cause the foil cap sealer system to shutdown.

According to a further aspect the present invention, in addition to notifying a system operator of individual fault conditions, the controller may also keep cumulative counts of each fault condition or combinations of different fault conditions. Here, a system operator may configure the monitoring system to notify the operator when any of these cumulative faults reaches a specified value. Upon reaching such a value, the controller may cause the display system to active one or more peripheral devices to notify the operator.

According to a still further aspect of the present invention, the controller uses one or more pre-stored parameters when processing data received from the sensors. Notably, these parameters may be specific to the particular work pieces being sealed and thereby need to be set accordingly. In the preferred embodiment of the present invention, a system operator enters several sets of pre-stored parameters, each set for a different work piece type, and stores each set of parameters as "recipes" in a memory storage device of the monitoring system. Based on the particular work pieces being sealed, a system operator selects the corresponding recipe prior to the start of the sealing operation.

Other features and benefits of the present invention will become apparent from the following description of the invention which refers to the accompanying drawings.

BRIEF DESCRIPTION OF THE DRAWINGS

FIG. 1 schematically illustrates cap foil sealing by an induction head according to the prior art.

FIGS. 2A, 2B, and 2C schematically illustrate a plurality of induction heads according to the prior art.

FIG. 7A schematically illustrates a side plan view of a photo eye sensor and foil detector, and the relative positioning thereof, in an induction foil cap sealer system according to the present invention.

FIG. 7B schematically illustrates a top plan view of the arrangement illustrated by FIG. 7A.

FIG. 7C schematically illustrates a front plan view of the arrangement illustrated by FIG. 7A.

DETAILED DESCRIPTION OF THE PREFERRED EMBODIMENTS

Figure 3:
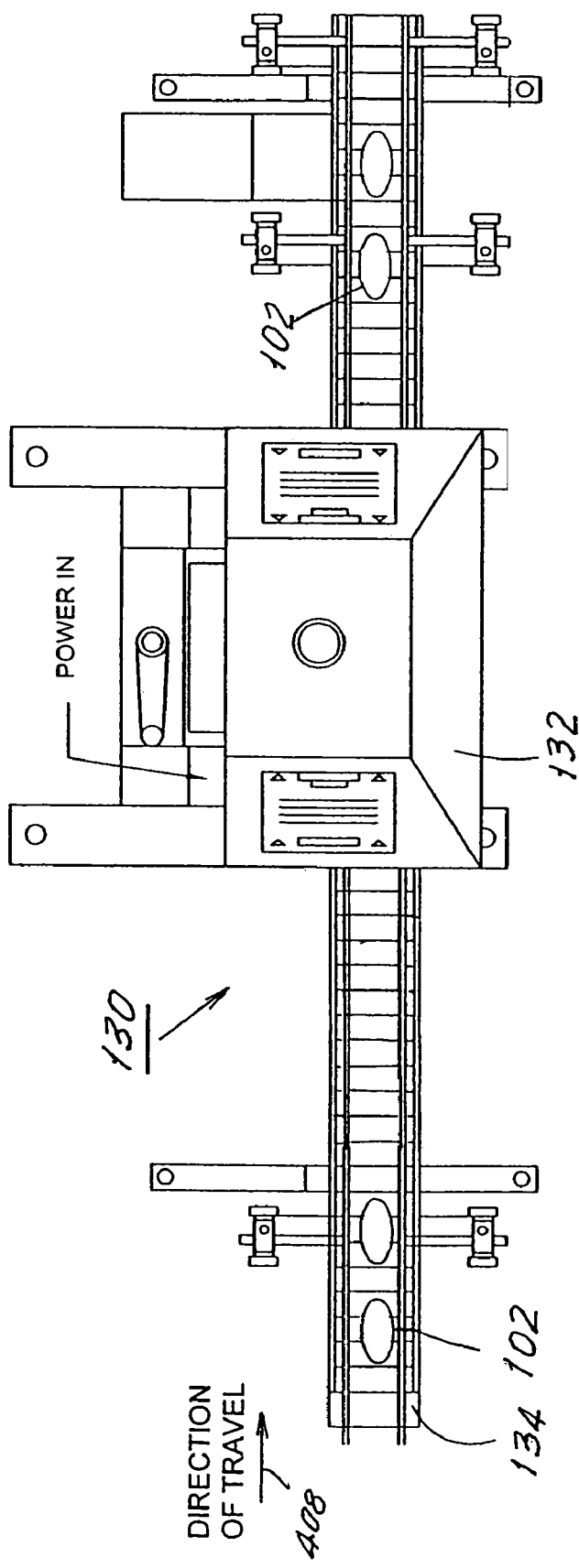
FIG. 3 schematically illustrates a top plan view of an induction foil cap sealer system according to the prior art.
Figure 4A:
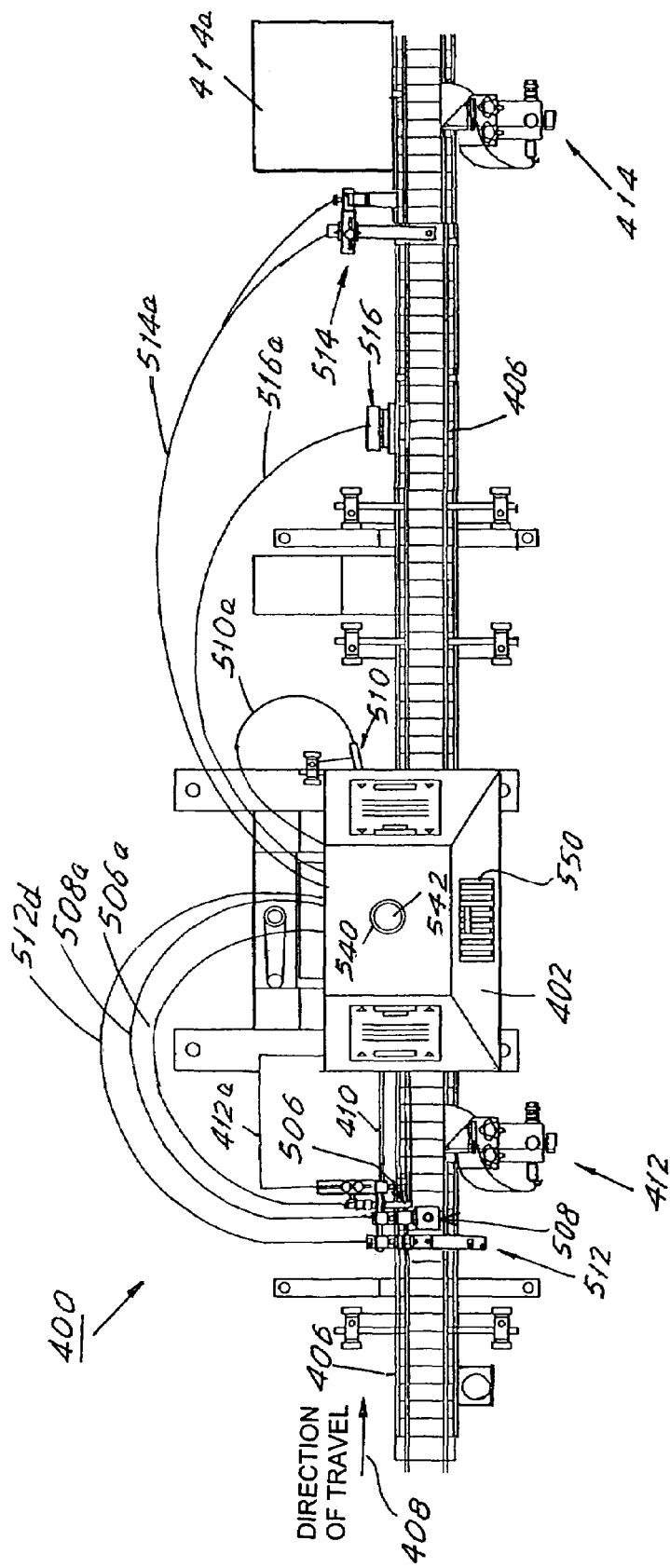
FIG. 4A schematically illustrates a top plan view of an induction foil cap sealer system with a monitoring system that comprises a plurality of sensors according to the present invention.
Figure 4B:
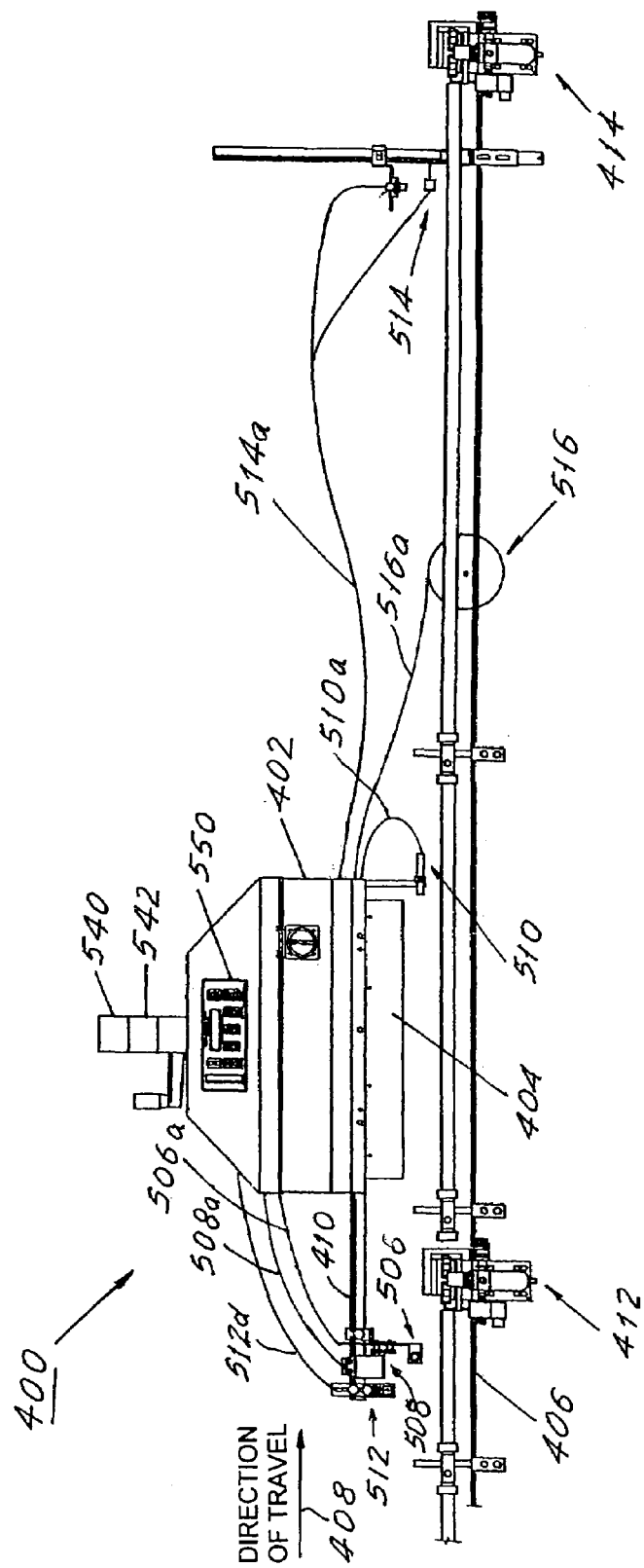
FIG. 4B schematically illustrates a front plan view of the induction foil cap sealer system illustrated by FIG. 4A.
Figure 5A:
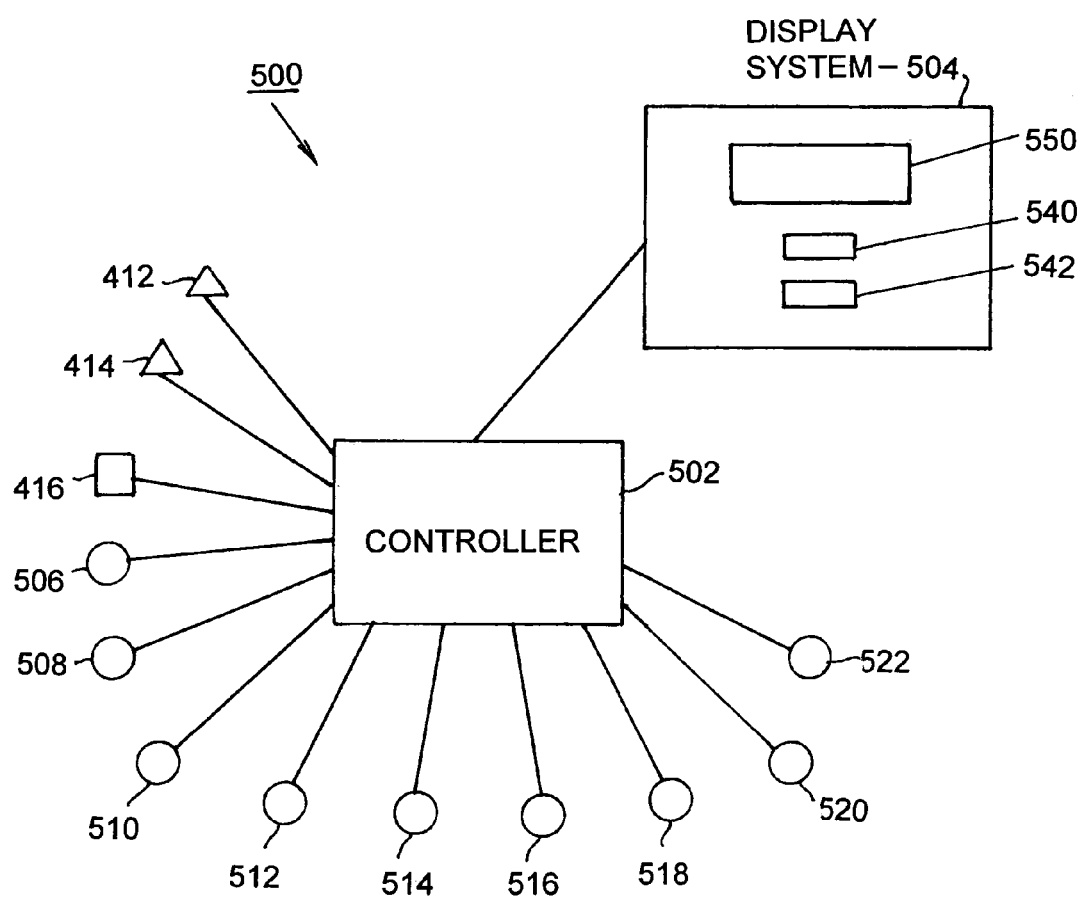
FIG. 5A illustrates a high level functional architecture of a monitoring system for an induction foil cap sealer system according to the present invention.

Referring to FIGS. 4A and 4B, there is illustrated an induction foil cap sealer system 400 according to an embodiment of the present invention with FIG. 4A showing a top plan view of the system and FIG. 4B showing a front plan view. System 400 includes an induction cap sealer unit 402 with an induction head 404. Induction head 404 may resemble any of the example induction heads illustrated in FIGS. 1, 2A, 2B, and 2C, for example. Induction head 404 is preferably positioned over a conveyor belt 406 that transports work pieces (e.g., containers such as bottle 102) under induction head 404. System 400 of the present invention also includes monitoring system 500, a high level functional architecture of which is represented in FIG. 5A. During the sealing operation, work pieces are transported on conveyor belt 406, in direction 408, and under induction head 404 where the work pieces are subjected to induction heating in a conventional manner. Conveyor belt 406 then continues to carry the work pieces beyond cap sealer unit 402 where the pieces subsequently exit system 400. Significantly and according to the present invention, monitoring system 500 monitors various conditions related to the sealing operation and conveys data related to these conditions to a system operator.

More specifically, monitoring system 500 of the present invention comprises a plurality of sensors 506-522 disposed along conveyor belt 406 and within induction cap sealer unit 402, each sensor monitoring a respective condition related to the sealing operation of induction foil cap sealer system 400. As described below, these conditions may relate to the work pieces themselves or to the cap sealer unit 402/conveyor belt 406. Sensors 506-522 may include a work piece counter 506, a missing foil sensor 508, a stalled bottle sensor 510, a high/skewed cap sensor 512, a work piece temperature sensor 514, a work piece speed sensor 516, a power sensor 518, cap sealer unit heat sensors 520, and cap sealer unit guard sensors 522. Notably, those skilled in the art will recognize that monitoring system 500 does not need to include each of the sensors 506-522 and will also recognize that other sensors may be incorporated into monitoring system 500.

Monitoring system 500 also comprises controller 502 situated preferably within induction cap sealer unit 402. Controller 502 is configured to receive from the sensors data representing the monitored conditions and to process this data, determining operating information/statistics related to the sealing operation and possibly fault conditions with the sealing operation. Controller 502 is also configured to communicate with a display system 504 and to cause this display system to report to a system operator, for example, fault conditions and other operating information related to the monitored conditions. Notably, controller 502 may be an off-the-shelf general-purpose programmable microprocessor/microcomputer that is configurable and that has been configured to perform the functions as described herein. Controller 502 may also be a general-purpose computer/PC. In addition, while controller 502 is described as being a single processor/computer, the functionality of controller 502 may be implemented as one or more processors/computers, with each sensor communicating with possibly one or more of these processors/computers, and with the capabilities of each processor/computer possibly differing.

Figure 5B:
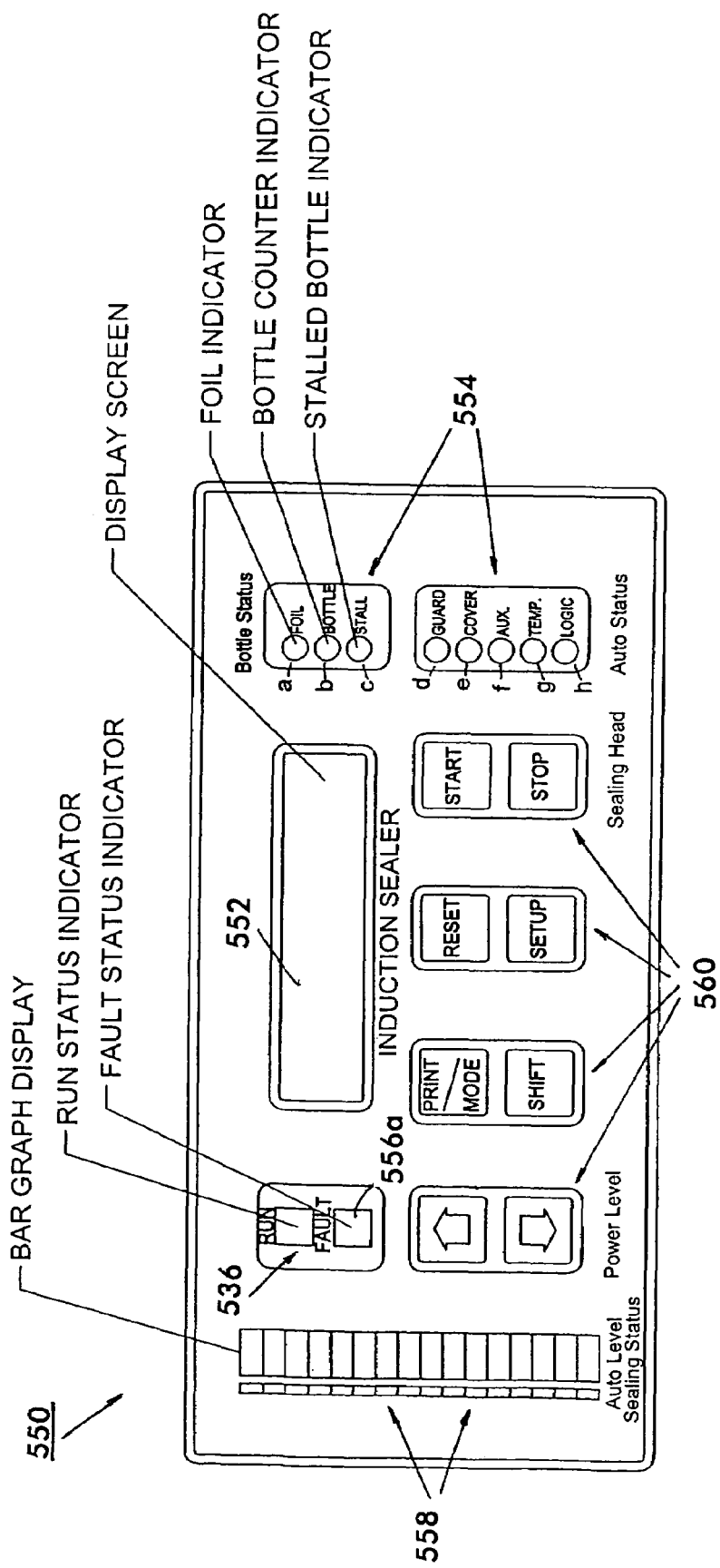
FIG. 5B illustrates an example of a user interface as used in a monitoring system of the present invention.

Display system 504 may comprise a user interface 550, an audio signal generator 540 (e.g., alarm), an optical signal generator 542 (e.g., a strobe light), or any combination thereof. Referring to FIG. 5B, an example user interface 550 according to the present invention may comprise user display 552, such as an LCD, a plurality of LEDs 554, 556, and 558, and a keypad 560 for allowing a system operator to control cap sealer system 400 and monitoring system 500. Notably, through sensors 506-522 and display system 504, monitoring system 500 of the present invention monitors and reports possible fault conditions with the sealing operation of foil cap sealer system 400 and thereafter enables an operator to examine data related to various conditions reported by the sensors in order to determine a possible cause(s) for the faults.

Reference will now be made to each of sensors 506-522. Again, sensors 506-522 are only examples of possible sensors and system 500 need not include each of these sensors and may include other sensors, without deviating from the present invention. In addition, while specific examples of each of sensors 506-522 are described below, any sensor known in the art capable of sensing the described condition can be used.

Figure 6B:
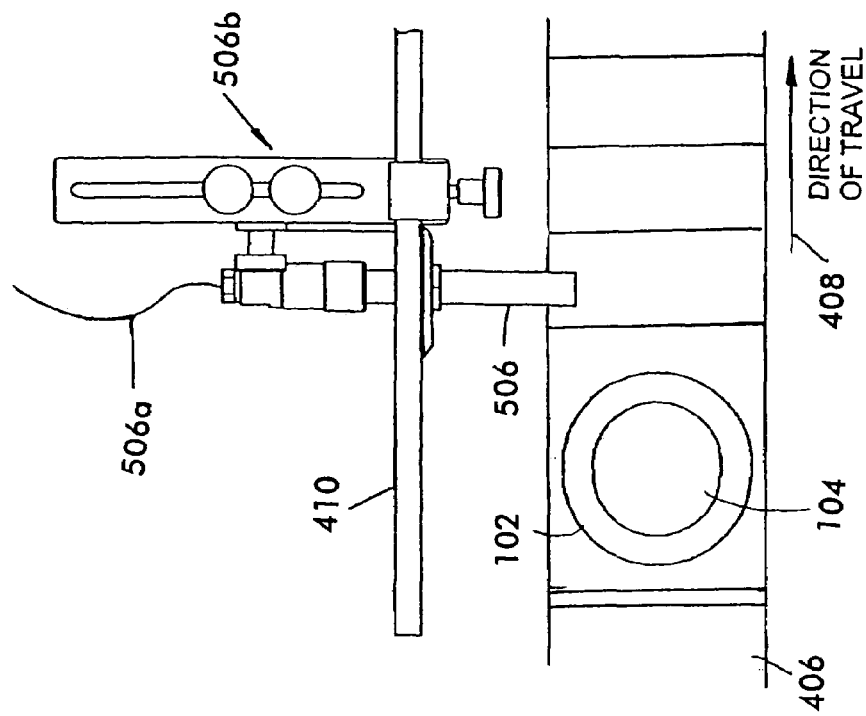
FIG. 6B schematically illustrates a top plan view of FIG. 6A.

Beginning with work piece counter 506, this sensor detects each work piece as it moves on conveyor belt 406 and in this way, enables monitoring system 500 to both detect work pieces and to count the number of work pieces passing under cap sealer unit 402. More specifically, in the preferred embodiment of the present invention, work piece counter 506 is a photo eye that detects a reflection from each work piece as it passes on conveyor belt 406. Referring to FIGS. 4A and 4B and to FIGS. 6A and 6B, photo eye 506 is preferably mounted along conveyor belt 406 upstream from cap sealer unit 402 and is positioned such that the photo eye is directed across the conveyor belt at the side of each passing work piece. Controller 502 is configured to receive data generated by photo eye 506, which is connected by wire 506a to a connector manifold on cap sealer unit 402, and in turn to controller 502 using any mechanism known in the art. As a work piece passes photo eye 506, the eye detects a reflection from the work piece and sends a data signal to controller 502 until the work piece passes. In the preferred embodiment of the present invention, photo eye 506 is configured to only detect a work piece when induction head 404 is on.

Notably, upon receiving a signal from photo eye 506, controller 502 may increment an internal counter (e.g., a work piece counter) by one, thereby counting the number of work pieces passing under cap sealer unit 402. Controller 502 may in turn forward this count to display system 504 such that the display system displays the count on visual display 552, for example. Controller 502 may also use the count to determine the number of work pieces processed per unit of time and again display this data on visual display 552. Controller 502 may also compare the count to a "batch-preset" value, which is a pre-stored parameter entered by an operator, for example. Specifically, according to an aspect of the present invention, a system operator can use keypad 560 or the like, for example, to enter pre-stored parameters for subsequent use by controller 502. Accordingly, the system operator may enter a "batch-preset" value, which represents the number of work pieces that should be sealed. As an example, upon counting "batch-preset" work pieces, the controller may be configured to cause the display controller to display a message (e.g., "ALERT-BATCH COUNT REACHED") on visual display 552 indicating that the batch is complete.

In addition to incrementing counters, etc. in response to the data signal from photo eye 506, controller 502 may also be configured to cause display controller 504 to illuminate/flash an LED, such as LED 554b, thereby indicating that another work piece has been processed.

To mount photo eye 506 to foil cap sealer system 400, a sensor mounting bar 410 is preferably connected to cap sealer unit 402 such that bar 410 extends above and along conveyor belt 406, as illustrated in FIGS. 4A and 4B. Photo eye 506 is then connected to sensor mounting bar 410 preferably using a mount assembly 506b that allows the photo eye to be positioned along sensor mounting bar 410 and that allows the vertical and horizontal positions of the photo eye to be adjusted.

Figure 6A:
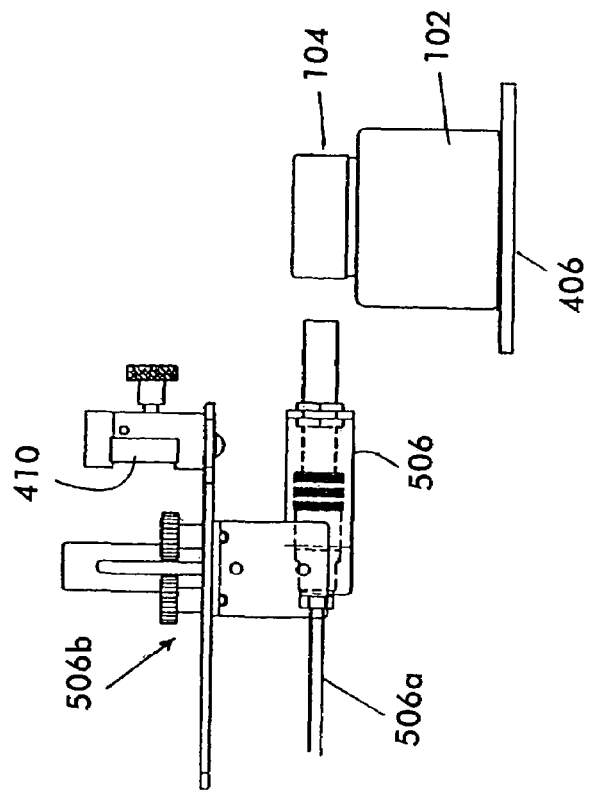
FIG. 6A schematically illustrates a side plan view of a photo eye sensor in an induction foil cap sealer system according to the present invention.

In the preferred embodiment of the present invention, photo eye 506 is vertically positioned such that the photo eye is the same height as the center of the work piece neck, as illustrated in FIG. 6A, and is horizontally positioned such that the photo eye is approximately ½" from the side of the work piece neck. Preferably, photo eye 506 includes a gain (sensitivity) adjustment to account for clear and flat-black work pieces that may not reflect light well and further includes an integral LED that illuminates when a work piece is detected. Assuming such a gain adjustment is present, a work piece is placed in front of the photo eye and the gain adjustment configured until the integral LED illuminates while the work piece is in front of the eye and goes-out when the work piece is removed. Preferably, photo eye 506 is positioned and the gain adjustment set such that the photo eye detects a work piece both when the work piece contains a cap and when the work piece does not contain a cap. In this way, the photo eye can also be used to detect whether a work piece is missing a cap, as described below.

Referring now to missing foil sensor 508, this sensor detects the presence, or lack thereof, of a metallic foil under the cap of a work piece as the work piece moves on conveyor belt 406 and in this way, enables monitoring system 500 to monitor missing-foil fault conditions. More specifically, in the preferred embodiment of the present invention, missing foil sensor 508 is a foil detector, as is known in the art, that works in conjunction with photo eye 506. Referring to FIGS. 4A and 4B and to FIGS. 7A-7C (FIG. 7A, in particular, showing an expanded view of photo eye 506 and foil detector 508 from the intake end of system 400), foil detector 508 is preferably mounted along conveyor belt 406 upstream from cap sealer unit 402 and coincident with photo eye 506. In addition, foil detector 508 is preferably positioned such that the detector is directed downward over conveyor belt 406 so that the cap of each passing work piece moves directly under the foil detector. Controller 502 is configured to receive data generated by foil detector 508, which is connected by wire 508a to the connector manifold on cap sealer unit 402 and in turn to controller 502. As a work piece passes under foil detector 508, if the detector senses a metallic foil it sends a data signal to controller 502 until the work piece passes. Accordingly, if controller 502 receives a signal from both photo eye 506 (thereby indicating the presence of a work piece) and foil detector 508, the controller registers that the work piece contains a metallic foil. On the contrary, if controller 502 receives a data signal from photo eye 506, indicating the presence of a work piece, but does not receive a signal from foil detector 508, the controller registers that the work piece does not contain a foil, thereby noting a fault condition. Notably, through the combination of foil detector 508 and photo eye 506, monitoring system 500 can also detect work pieces without caps since the cap and foil are typically applied to a work piece as a single unit.

Upon registering that a work piece contains a metallic foil, controller 502 may be configured to cause display system 504 to illuminate/flash an LED, such as LED 554a, thereby indicating that the work piece has a foil liner. Alternatively, upon registering a fault condition (i.e., lack of a metallic foil liner or no cap), controller 502 may be configured to cause display system 510 to activate signal generator 540 and/or optical signal generator 542, to flash a fault LED, such as LED 556a, to display a text message (e.g., "ALERT-MISSING FOIL") on visual display 552, or some combination thereof, thereby notifying a system operator of the fault condition. Preferably, controller 502 is also configured to cause a fault signal to be generated to a rejecter 412, as seen in FIGS. 4A and 4B, which may be a pneumatic arm positioned relative to foil detector 508. In this way, when controller 502 determines a work piece has no metallic foil, the controller can cause the work piece to be pushed off conveyor belt 406 and onto a rejecter table 412*a*. As an alternative to rejecter 412, controller 502 preferably is configured to cause a fault signal to be generated to a shut-off relay 416, for example, thereby shutting off induction head 404 and possibly conveyor belt 406.

In addition, upon registering a fault condition, controller 502 may increment one or more internal counters, such as a counter that maintains the number of detected work pieces without metallic foils (e.g., a "fault-no-foil" counter) and/or a generic counter that maintains the number of faults detected by monitoring system 500 (e.g., a "generic-fault" counter). In addition to displaying these counts through display system 504, controller 502 may also notify a system operator when a specified number of missing-foil faults or generic-faults have been detected. Specifically, according to an aspect of the present invention, a system operator may enter as a pre-stored parameter an upper limit on detected missing-foil faults and/or an upper limit on detected generic-faults for the present batch of work pieces. When controller 502 detects the specified number of missing-foil faults, it may be configured to cause display system 504 to display a text message (e.g., "CONSECUTIVE FAULTS-MISSING FOIL") on visual display 552 and flash LED 556*a*, for example. Similarly, when controller 502 detects the specified number of generic-faults, it may be configured to cause display system 504 to display a text message such as "ALERT EXCESS FAULT" on visual display 552 and flash LED 556*a*.

In the preferred embodiment of the present invention, foil detector 508 is connected to sensor mounting bar 410 using a mount assembly 508*b* that allows the foil detector to be positioned along the mounting bar and that also allows the vertical and horizontal positions of the foil detector to be adjusted. Preferably, foil detector 508 is horizontally positioned such that the caps/metallic foils of passing work pieces move directly under the foil detector and is vertically positioned such that the bottom of the foil detector is even or level with the bottom of the inner tunnel of induction head 404.

In order to prevent monitoring system 500 from falsely detecting missing metallic foils, foil detector 508 is preferably mounted upstream from photo eye 506, as illustrated in FIGS. 7B and 7C, such that foil detector 508 senses the metallic foil of a work piece just prior to photo eye 506 detecting the work piece. In order to overlap the signals generated by the two sensors, monitoring system 500 preferably maintains a "foil-timer" as a pre-stored parameter (an operator can pre-configure the foil timer using keypad 560, for example). Specifically, as indicated above, as a work piece leaves foil detector 508, the detector stops sending a signal to controller 502. The foil-timer causes monitoring system 500 to extend or lengthen the assertion of the signal from the foil detector once the work piece leaves the detector. Preferably, the foil-timer, which can be set at increments of 0.10 seconds for example, is set such that the signal from foil detector 508 remains asserted for a short period of time until after photo eye 506 stops generating a signal to controller 502. In this way, the two signals coincide at controller 502, thereby prevent monitoring system 500 from falsely detecting missing metallic foils.

As described above, controller 502 can be configured to cause LEDs 554*b* and 554*a* to illuminate while receiving a data signal from photo eye 506 and foil detector 508, respectively. As such, in a method according to the present invention, a system operator can configure the foil-timer such that as a bottle moves on conveyor belt 406, LED 554*a* first illuminates and remains on, LED 554*b* then illuminates for a short time and then extinguishes, and LED 554*a* thereafter remains illuminated for a short time and then also extinguishes.

Figure 8:
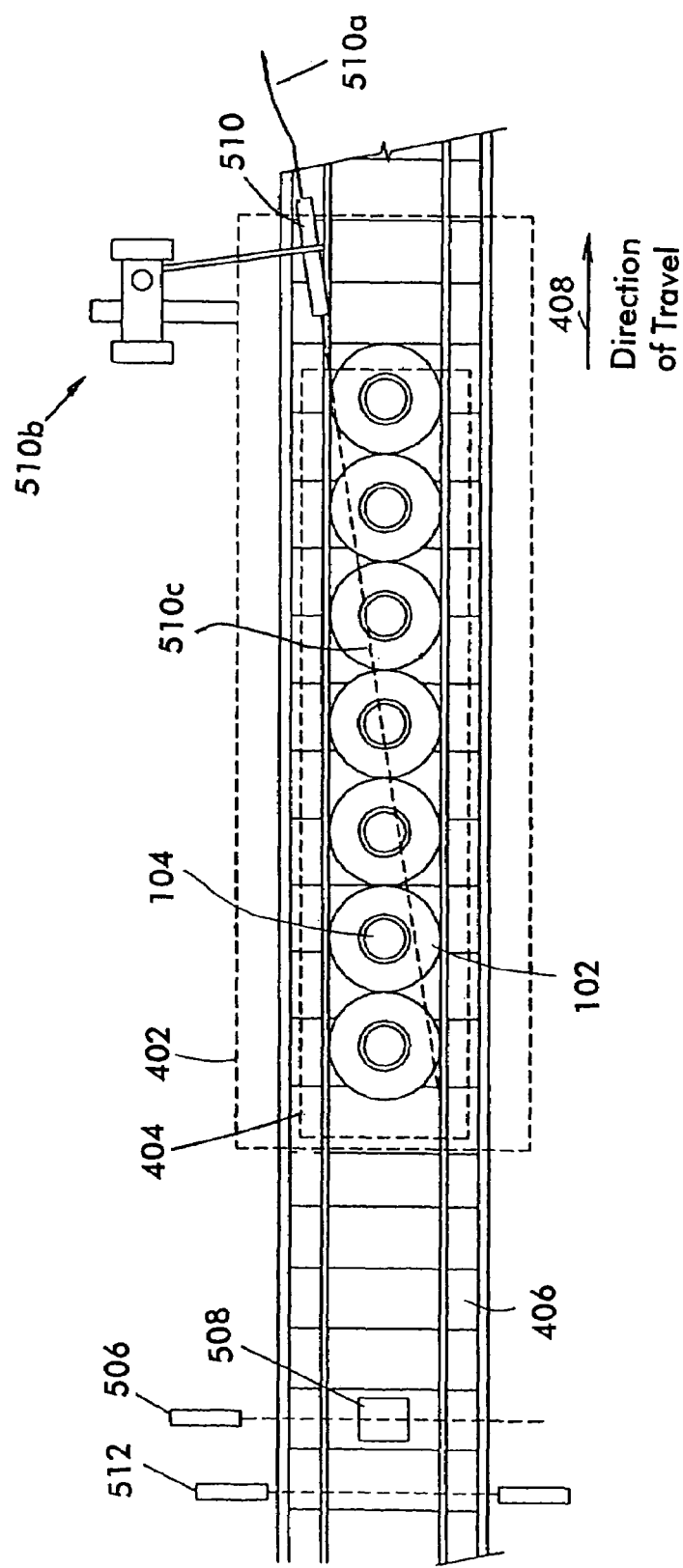
FIG. 8 schematically illustrates a top plan view of another photo eye sensor, and the positioning thereof, in an induction foil cap sealer system according to the present invention.

Referring now to stalled bottle sensor 510, this sensor detects whether work pieces are backed-up under induction head 404 and/or if conveyor belt 406 is stopped with one or more work pieces under induction head 404 and in this way, enables monitoring system 500 to monitor a stalled fault condition that may cause work pieces to overheat under head 404. More specifically, in the preferred embodiment of the present invention, stalled bottle sensor 510 is a photo eye that works in conjunction with photo eye 506. Referring to FIG. 4B and to FIG. 8 (which shows a top plan view of induction cap sealer unit 402 and induction head 404, both shown in dotted line), photo eye 510 is preferably mounted at the underside and discharge end of cap sealer unit 402 and is positioned such that the photo eye is directed at an angular/diagonal direction across conveyor belt 406 such that the photo eye detects any work pieces under induction head 404. Controller 502 is configured to receive data generated by photo eye 510, which is connected by wire 510*a* to the connector manifold on cap sealer unit 402 and in turn to controller 502. As work pieces pass through the sight of photo eye 510, the photo eye detects reflections from the work pieces and sends a data signal to controller 502 until no work pieces are detected.

According to the present invention, if controller 502 detects, for example, both a change in the work-piece-counter (signifying that photo eye 506 is detecting the passing of work pieces) while also receiving a data signal from photo eye 510 (signifying that one or more work pieces are under induction head 404), the controller registers that no stalled condition has occurred. On the contrary, if controller 502 detects no change in the work-piece-counter while receiving a data signal from photo eye 510, the controller registers a fault condition related to stalled work pieces being under induction head 404. More specifically, in the preferred embodiment of the present invention, when controller 502 receives a data signal from photo eye 510, controller 502 starts a "stalled-timer" (an operator can configure the stalled-timer, at increments of 0.10 seconds for example, as a pre-stored parameter using keypad 560, for example). If this timer expires before controller 502 detects a change in the work-piece-counter, the controller registers the fault condition. In general, the stalled-timer is set to a value representing the time between photo eye 510 first detecting a work piece and photo eye 506 then detecting another work piece, plus ½ second. Notably, the stalled-timer value must be adjusted based on the speed of convey belt 406.

In general, when controller 502 receives a data signal from photo eye 510, controller 502 may be configured to cause display controller 504 to illuminate/flash an LED, such as LED 554*c*, thereby indicating that the photo eye is detecting a work piece(s). Upon registering a "stalled" fault condition, controller 502 may be configured to cause display system 510 to activate signal generator 540 and/or optical signal generator 542, to flash the fault LED 556*a*, to display a text message (e.g., "ALERT-STALLED BOTTLE") on visual display 552, or some combination thereof, thereby notifying a system operator of the fault condition. Preferably, controller 502 is also configured to cause a fault signal to be generated to shut-off relay 416, thereby shutting off induction head 404 and possibly conveyor belt 406.

In addition, upon registering a stalled fault condition, controller 502 may increment a "fault-stalled-bottle" counter and/or the "generic-fault" counter, which was described above. Again, in addition to displaying the counter values, according to the present invention a system operator may provide as a pre-stored parameter an upper limit of detected "stalled" faults. When controller 502 detects the specified number of faults, it may be configured to cause display system 504 to display a text message (e.g., "CONSECUTIVE FAULTS-STALLED BOTTLE") on visual display 552 and flash LED 556a, for example.

In the preferred embodiment of the present invention, photo eye 510 is mounted at the underside and discharge end of cap sealer unit 402 using a mount assembly 510b that allows the vertical position of the photo eye to be adjusted and that allows the angular direction of the photo eye to be adjusted. Preferably, photo eye 510 is positioned such that the photo eye is directed diagonally under induction head 404 in the path of the moving work pieces such that the photo eye detects any work pieces under the sealing head, as illustrated by path 510c in FIG. 8. Preferably, photo eye 510 also has a gain (sensitivity) adjustment and an integral LED that illuminates when a work piece is detected by the photo eye. Assuming such a gain adjustment is present, a work piece is placed in front of the photo eye and the gain adjustment configured until the integral LED illuminates.

Referring now to high/skewed cap sensor 512, this sensor detects whether a work piece has a skewed cap or a cap that is not tightened and in this way, enables monitoring system 500 to detect a high/skewed cap fault condition. As an example, a high/skewed cap may cause the underlying metallic foil to not contact and thereby not seal to the opening of a work piece.

Figure 9B:
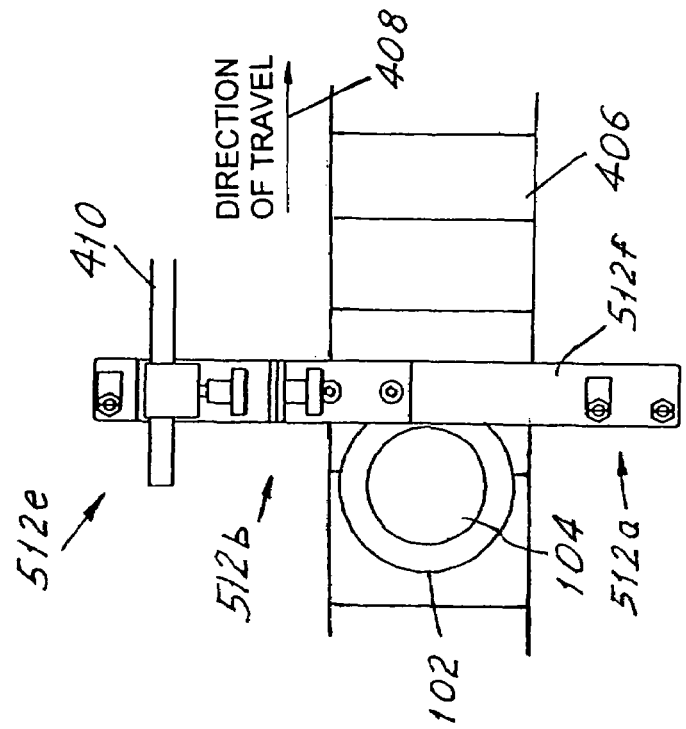
FIG. 9B schematically illustrates a top plan view of FIG. 9A.
Figure 9A:
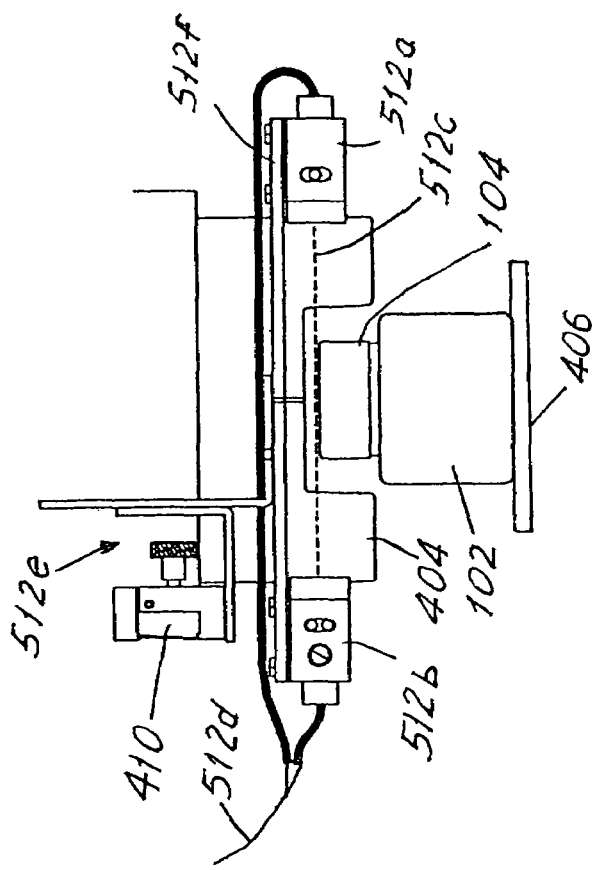
FIG. 9A schematically illustrates a side plan view of a laser emitter and receiver in an induction foil cap sealer system according to the present invention.

In the preferred embodiment of the present invention, high/skewed cap sensor 512 is a laser sensor or photo eye. For description purposes, the laser sensor is described below. Referring to FIGS. 4A and 4B and to FIGS. 9A and 9B (which show an expanded view of laser sensor 512 from the intake end of system 400 and from the top-side of the sensor, respectively), laser sensor 512 comprises an emitter 512a that emits a beam 512c to a receiver 512b, the emitter and receiver being mounted to a common frame 512f. The sensor is preferably mounted upstream from cap sealer unit 402 and foil detector 508 to sensor mounting bar 410 using a mounting clamp 512e that allows the sensor to be positioned along the mounting bar and also allows the vertical height of the sensor to be adjusted. The sensor is oriented such that laser beam 512c projects above and across conveyor belt 406. Preferably, laser sensor 512 is set at a vertical height above conveyor belt 406 such that laser beam 512c is approximately 1/32" above a "tightened" cap of a work piece passing on conveyor belt 406.

Laser emitter 512a and receiver 512b are connected by two wires 512d to the connector manifold on cap sealer unit 402, with one wire powering the emitter and the other wire conveying data signals from the receiver to controller 502. As a work piece passes across laser sensor 512, if the cap is skewed or high, it will break laser beam 512c, thereby causing receiver 512b to send a data signal to controller 502 and causing the controller to register a fault condition. On the contrary, if the cap on the work piece is correctly aligned and tightened, the work piece will pass under laser beam 512c and no data signal will be sent to the controller.

Upon registering that a work piece contains a skewed/high cap, controller 502 may be configured to cause display system 510 to activate signal generator 540 and/or optical signal generator 542, to flash the fault LED 556a, to display a text message (e.g., "ALERT-HIGH/SKEWED CAP") on visual display 552, or some combination thereof, thereby notifying a system operator of the fault condition. Preferably, controller 502 is also configured to cause a fault signal to be generated to rejecter 412 thereby causing the work piece to be pushed off conveyor belt 406 and onto a rejecter table 412a. As an alternative to rejecter 412, controller 502 is preferably configured to cause a fault signal to be generated to shut-off relay 416, thereby shutting off induction head 404 and possibly conveyor belt 406.

In addition, upon registering a skewed/high cap fault condition, controller 502 may increment a "fault-skewed/high-cap" counter and/or the "generic-fault" counter. Again, according to the present invention, a system operator may provide a pre-stored upper limit of detected skewed/high cap faults. When controller 502 detects the specified number of faults, it may be configured to cause display system 504 to display a text message (e.g., "CONSECUTIVE FAULTS-SKEWED/HIGH CAP") on visual display 552 and flash fault LED 556a, for example.

Referring now to work piece temperature sensor 514, this sensor senses the temperature of a work piece after the work piece has been heated under induction head 404 and in this way, enables monitoring system 500 to determine whether a metallic foil has been properly sealed to a work piece, an improper seal registering a fault condition. In the preferred embodiment of the present invention, work piece temperature sensor 514 is a sensor that is configured and operates as described in co-pending U.S. patent application Ser. No. 10/859,830, filed Jun. 2, 2004, entitled "INDUCTION SEALER SYSTEM WITH TEMPERATURE SENSOR" by Kenneth J. Herzog, the contents of which are hereby incorporated by reference.

As described in that patent application and as illustrated in FIGS. 4A and 4B, temperature sensor 514 is preferably an infrared sensor installed downstream from cap sealer unit 402 near conveyor belt 406 so as to sense the temperature of a work piece after the work piece has been heated by induction head 404. Infrared sensor 514 is connected by wire 514a to the connector manifold on cap sealer unit 402 and in turn, is in communication with controller 502. As a work piece passes under the infrared sensor, the sensor takes a temperature reading of the work piece cap and sends this reading to controller 502. To assess whether a proper seal has been obtained, controller 502 determines whether the temperature of the work piece is within a specified range. Specifically, controller 502 compares the temperature to a high threshold temperature value and to a low threshold temperature value (these values are pre-stored parameters of system 500 and can be set by a system operator). A high threshold temperature value is indicative of overheating, while a low threshold temperature value is indicative of under heating, both of which can indicate an improper seal. When the detected temperature is either below the low threshold temperature value or above the high threshold temperature value, controller 502 registers a temperature fault.

Upon registering a temperature fault, controller 502 may be configured to cause display system 510 to activate signal generator 540 and/or optical signal generator 542, to flash the fault LED 556a, to display a text message (e.g., "ALERT-LOW CAP TEMP" or "ALERT-HIGH CAP TEMP") on visual display 552, or some combination thereof, thereby notifying a system operator of the fault condition. Preferably, controller 502 is also configured to cause a fault signal to be generated to a rejecter 414 thereby causing the work piece to be pushed off conveyor belt 406 and onto a rejecter table 414a. As an alternative to rejecter 414, controller 502 is preferably configured to cause a fault signal to be generated to shut-off relay 416, thereby shutting off induction head 404 and possibly conveyor belt 406.

In addition, upon registering a low temperature or high temperate fault, controller 502 may increment a "fault-low-temp" counter or a "fault-high-temp" counter and/or the "generic-fault" counter. Again, according to the present invention, a system operator may provide a pre-stored upper limit for each of the low and high temperature fault counters. When controller 502 detects the specified number of faults, it may be configured to cause display system 504 to display a text message (e.g., "CONSECUTIVE FAULTS—LOW CAP TEMP" or "CONSECUTIVE FAULTS—HIGH CAP TEMP") on visual display 552 and flash fault LED 556a, for example.

Referring now to work piece speed sensor 516, this sensor senses the speed of conveyor belt 406 and in this way, allows monitoring system 500 to determine whether the conveyor belt is operating at a speed as configured by a system operator and to register a fault condition when there is a deviation in this speed. Specifically, an operator will configure conveyor belt 406 to operate at a predetermined speed that will cause work pieces to remain under induction head 404 for a desired time necessary to obtain good hermetic seal quality. If the conveyor belt speed deviates from the desired setting, a work piece may spend too much or too little time under induction head 404, thereby causing an over or under heating of the work piece. In the preferred embodiment of the present invention, work piece speed sensor 516 is a sensor that is configured and operates as described in co-pending U.S. patent application Ser. No. 10/860,756, filed Jun. 2, 2004, entitled "CONVEYOR SPEED MONITOR" by Kenneth J. Herzog, the contents of which are hereby incorporated by reference.

As described in that patent application, speed sensor 516 is preferably an optical encoder that registers the movement of conveyer belt 406. Optical encoder 516 is connected by wire 516a to the connector manifold on cap sealer unit 402 and in turn is in communication with controller 502. The optical encoder conveys data representing the conveyor belt movement to controller 502, which then uses this data to determine the conveyor belt speed. Thereafter, controller 502 compares the calculated speed to the predetermined/desired speed as configured by a system operator and if there is sufficient deviation (e.g., exceeds +/−5% of the desired speed), the controller registers a conveyor speed fault. Notably, work piece speed sensor 516 may also be a rotary wheel/dial that contacts the conveyor belt and spins accordingly. For each revolution of the dial, the sensor sends a signal to controller 502, which uses the signal to determine a conveyor speed, as similarly described in the above application.

In general, controller 502 may be configured to cause display system 510 to display the calculated speed of the conveyor belt on visual display 552. Upon registering a speed fault, controller 502 may cause display system 510 to activate signal generator 540 and/or optical signal generator 542, to flash the fault LED 556a, to display a text message (e.g., "ALERT-CONVEYOR SPEED") on visual display 552, or some combination thereof, thereby notifying a system operator of the fault condition.

Referring now to power sensor 518, this sensor senses the power drawn by the cap seal system 400 and in particular, by induction head 404. Preferably, the power sensor is located within cap sealer unit 402 and is interfaced to the power supply of the cap sealer system. In the preferred embodiment of the present invention, power sensor 518 may be a current detector that detects the current supplied from the power supply to induction head 404.

Notably, the sealing of each work piece consumes an amount of power. Accordingly, as the number of work pieces passing under induction head 404 increases, the power consumed increases proportionally. For example, as the number of work pieces increases, and/or the spacing of work pieces decreases, and/or the speed of conveyor belt 406 increases, more power is demanded by induction head 404. If the power demanded from induction head 404 exceeds the maximum power that induction head 404 is capable of providing under a selected power setting as set by an operator, the quality of the hermetic sealing may be adversely affected due to insufficient power per work piece. According to one aspect of the present invention, controller 502 receives from current detector 516 the detected current, which is proportional to the power supplied to the induction head, and uses the detected current to visually display, such as on bar graph 558 of user interface 550, a representation of the power supplied to the induction head. In this way, a system operator can visually monitor the power consumption of the induction head and can take appropriate action (e.g., increase the power setting) when the power drawn gets close to the maximum power allowed under the selected power setting.

In the preferred embodiment of the present invention, the visual displaying of consumed power by induction head 404 operates as described in co-pending U.S. patent application Ser. No. 10/860,753, filed Jun. 2, 2004, entitled "BAR GRAPH" by Kenneth J. Herzog, the contents of which are hereby incorporated by reference.

According to another aspect of the present invention, controller 502 uses the detected current from current detector 516 to detect a loss of sealing power, which can occur when the voltage supplied to cap sealer system 400 is insufficient for the requirements of the system and for the selected power level setting of the induction head. As an example, a defective power supply, a brownout, or a voltage fluctuation can cause controller 502 to detect a "sealing-power" fault condition. Controller 502 may also detect such a fault when there are too many work pieces under induction head 404 for the available power, similar to above.

Upon registering a loss of sealing-power fault condition, controller 502 may be configured to cause display system 510 to activate signal generator 540 and/or optical signal generator 542, to illuminate an LED, such as LED 554h, to flash the fault LED 556a, to display a text message (e.g., "ALERT-POWER SUPPLY") on visual display 552, or some combination thereof, thereby notifying a system operator of the fault condition. Preferably, controller 502 is also configured to cause a fault signal to be generated to shut-off relay 416, thereby shutting off induction head 404 and possibly conveyor belt 406.

According to another aspect of the present invention, controller 502 uses the detected current from current detector 516 to detect whether there is a power connection problem to induction head 404 (referred to as a high impedance fault) or whether the induction head is requesting more power than what is available from the power unit (referred to as a low impedance fault), this latter fault being caused, possibly, from work pieces being too closely spaced or the speed of the conveyor belt being too fast. Upon registering either of these faults, controller 502 may be configured to cause display system 510 to activate signal generator 540 and/or optical signal generator 542, to illuminate an LED, such as LED 554f, to flash the fault LED 556a, to display a text message (e.g., "ALERT-HIGH IMPEDANCE" or "ALERT-LOW IMPEDANCE") on visual display 552, or some combination thereof. Preferably, controller 502 is also configured to cause a fault signal to be generated to shut-off relay 416.

Referring now to cap sealer heat sensors 520, these are one or more temperature sensors within cap sealer unit 402 that sense the temperature of induction head 404 and/or the internal temperature of the cap sealer unit 402 and in this way, enable monitoring system 500 to determine when internal system temperatures have exceeded normal operating temperatures. When controller 502 detects an excessive temperature condition as related to these sensors, it may be configured to cause display system 510 to activate signal generator 540 and/or optical signal generator 542, to illuminate an LED, such as LED 554g, to flash the fault LED 556a, to display a text message (e.g., "ALERT-HEAD OVERTEMP" or "ALERT-SYSTEM OVERTEMP") on visual display 552, or some combination thereof. Preferably, controller 502 is also configured to cause a fault signal to be generated to shut-off relay 416.

Referring now to cap sealer guard sensors 522, these are one or more sensors that detect when safety covers and/or guards within cap sealer unit 402 are open and in this way, enable monitoring system 500 to notify a system operator that these safety covers and guards should be closed. Again, when controller 502 detects open guards or covers as indicated by these sensors, it may be configured to cause display system 510 to activate signal generator 540 and/or optical signal generator 542, to illuminate an LED, such as LED 554d/e, to flash the fault LED 556a, to display a text message (e.g., "ALERT-GUARD OPEN" or "ALERT-COVER OPEN") on visual display 552, or some combination thereof. Preferably, controller 502 is also configured to cause a fault signal to be generated to shut-off relay 416.

Figure 10:
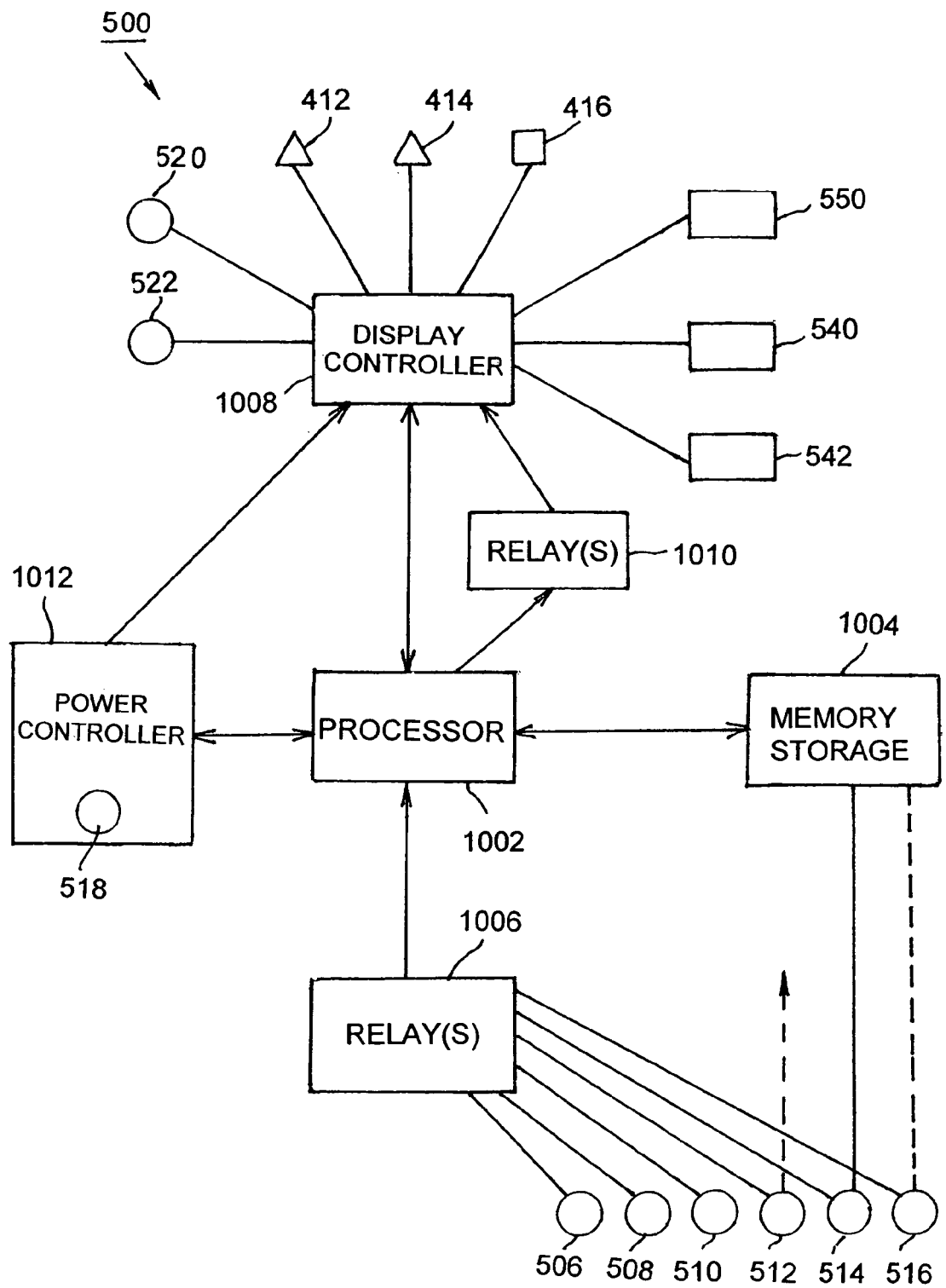
FIG. 10 illustrates a functional architecture of a monitoring system for an induction foil cap sealer system according to the present invention.

Referring now to FIG. 10, there is illustrated an example functional architecture of monitoring system 500. System 500 comprises one or more microcomputer(s)/microprocessor(s) 1002 interfaced to an electronic memory storage 1004. Notably, microcomputer(s)/microprocessor(s) 1002 may be off-the-shelf general-purpose programmable microcomputer(s)/microprocessor(s) that are configurable and that have been configured to perform the functions as described herein. Microcomputer(s)/microprocessor(s) 1002 may also be general-purpose computer(s)/PC(s). Electronic memory storage 1004 may be standard off-the-shelf memory modules.

Processor 1002 is configured to receive data representing monitored conditions from work piece counter 506, missing foil sensor 508, stalled bottle sensor 510, high/skewed cap sensor 512, work piece temperature sensor 514, and work piece speed sensor 516, and is further configured to process the received data from these sensors to determine, for example, fault conditions as described above. As processor 1002 processes received data from the sensors during the sealing operation, the processor may retrieve one or more pre-stored parameters from memory 1004 in order to process the data and may also store parameter values, such as counter values (e.g., work piece counter value and fault counter values) within memory 1004.

With respect to the pre-stored parameters (e.g., fault counter limits, foil-timer, stalled-timer, temperature ranges, etc.) of monitoring system 500, these parameters may be specific to the particular work pieces being sealed and thereby need to be configured accordingly. In the preferred embodiment of the present invention, a system operator may use user interface 550, for example, to enter several sets of pre-stored parameters, each set for a different work piece type, and to store each set of parameters as "recipes" in memory storage 1004. Based on the particular work piece being sealed, a system operator can later select a corresponding stored recipe prior to the start of the sealing operation.

With respect to communications between processor 1002 and the sensors, processor 1002 may receive data from the sensors indirectly through memory storage 1004, the data from the sensors first being conveyed to the memory storage and the processor retrieving the data therefrom (e.g., temperature sensor 514 may convey temperature readings to memory 1004). Processor 1002 may also receive data from the sensors through relays 1006. Here, a sensor will send an electronic signal (e.g., a current) to an associated coil that in turn activates a corresponding relay, which then signals the processor. For example, when photo eye 506 detects a passing work piece, it may send an electronic signal to a corresponding photo eye coil, which then activates a relay associated with the photo eye. As a result of activating the relay, processor 1002 may increment the "work piece counter".

System 500 also comprises a display controller 1008 that controls peripheral devices including user interface 550, audio signal generator 540, optical signal generator 542, rejecters 412-414, and shut-off relay 416. Processor 1002 is configured to send signals/data to display controller 1008 and to cause the display controller to activate any of these peripheral devices as described above. Processor 1002 may communicate directly with display controller 1008 or through one or more relays 1010. With respect to relays 1010, processor 1002 may cause a signal (e.g., a current) to be sent to a coil that in turn activates a corresponding relay. The activation of the relay can result in the activation of one or more of the peripheral devices by display controller 1008.

System 500 also comprises a power controller 1012 that includes power sensor 518. Power controller 1012 and/or processor 1002 may process the power detected by sensor 518 in order to monitor the power related conditions described above. Notably, power controller 1012 may be configured to directly send data signals to display controller 1008 to cause the display controller to activate the peripheral devices. For example, the power controller may send signals to the device controller to illuminate bar graph 558 in relation to the consumption of power by induction head 404.

Lastly, regarding cap sealer unit heat sensors 520 and cap sealer guard sensors 522, these sensors may be configured to directly send signals to display controller 1012 in order to activate one or more of the peripheral devices.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An automated capping system that performs a sealing operation to install foil seals on work pieces comprising:
   a cap sealer to apply energy to seal a foil seal of a cap onto a work piece; and
   a plurality of sensors each for monitoring a respective condition related to said sealing operation of said system, said conditions including at least a temperature of a work piece after application of energy to seal the foil seal onto the work piece, and a speed of said work pieces passing said cap sealer.

2. The system according to claim 1, wherein at least another condition is position of the cap on the work piece prior to application of energy.

3. The system according to claim 1, wherein at least another condition is a missing foil on a work piece prior to application of energy.

4. The system according to claim 1, wherein at least another condition is work piece stalling.

5. The system according to claim 1, wherein at least another condition is a power drawn by said cap sealer.

6. The system according to claim 1, further comprising a work piece counter.

7. The system according to claim 1, further comprising a display system to report data relating to said conditions.

8. The system according to claim 7, wherein said display system includes a text display system to visually report data representing said conditions.

9. The system according to claim 8, wherein said display system further includes a plurality of LEDs to visually report data representing said conditions.

10. The system according to claim 9, wherein said plurality of LEDs includes a set of LEDS to report power drawn by said cap sealer.

11. The system according to claim 1, further comprising a controller configured to receive from said sensors data representing said conditions and for determining a fault condition based on a pre-stored parameter.

12. The system according to claim 11, wherein said pre-stored parameter relates to the temperature of said work piece after application of energy.

13. The system according to claim 11, wherein said pre-stored parameter relates to the speed of said work pieces passing said cap sealer.

14. The system according to claim 11, wherein said pre-stored parameter relates to an upper limit of determined fault conditions.

15. The system according to claim 11, wherein said controller is configurable to reject a work piece based on a fault condition.

16. The system according to claim 11, wherein said controller is configurable to activate a visual indicator in response to a fault condition.

17. The system according to claim 11, wherein said controller is configurable to activate an audio indicator in response to a fault condition.

18. The system according to claim 11, wherein said controller is configurable to stop said sealing operation in response to a fault condition.

* * * * *